US007653602B2

(12) United States Patent
Davis

(10) Patent No.: US 7,653,602 B2
(45) Date of Patent: Jan. 26, 2010

(54) CENTRALIZED ELECTRONIC COMMERCE CARD TRANSACTIONS

(75) Inventor: Steve Davis, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 361 days.

(21) Appl. No.: 10/705,212

(22) Filed: Nov. 6, 2003

(65) Prior Publication Data

US 2006/0179007 A1 Aug. 10, 2006

(51) Int. Cl.
*G06Q 99/00* (2006.01)
(52) U.S. Cl. .............................. 705/64; 705/70; 705/74; 705/75; 705/76; 705/78; 713/150
(58) Field of Classification Search ............. 705/50–79, 705/30–44; 713/182–186, 150; 726/26–30
See application file for complete search history.

(56) References Cited

U.S. PATENT DOCUMENTS

| | | | |
|---|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |

(Continued)

FOREIGN PATENT DOCUMENTS

AU 200039412 A1 12/2000

(Continued)

OTHER PUBLICATIONS

"Internet based secure transactions using encrypting applets and cgi-scripts Independent of browser or server capabilities"; 1998, *IBM Research Disclosure*, No. 410116, pp. 800-801.

*Primary Examiner*—Jalatee Worjloh
(74) *Attorney, Agent, or Firm*—Townsend and Townsend and Crew LLP

(57) ABSTRACT

A central transaction server in electronic commerce card authorization system enables the electronic commerce card association to manage and monitor the authentication system. The central transaction server acts as an intermediary for all communications between the access control server used for authentication. If any portion of the authentication system fails, the central transaction server compensates by providing appropriate responses to other portions of the system. The centralized transaction server translates all incoming traffic into a format compatible with the intended recipient, enabling portions of the system to be upgraded without breaking compatibility with the non-upgraded portions. The centralized transaction server also enables the integration of formally separate portions of the authentication system into a single unit. The directory and the authentication history servers can be integrated into the central transaction server, and the central transaction server can initiate charges to the electronic commerce card automatically, bypassing the card acquirer.

30 Claims, 3 Drawing Sheets

U.S. PATENT DOCUMENTS

| | | | |
|---|---|---|---|
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |

| | | | |
|---|---|---|---|
| 6,012,635 A | 1/2000 | Shimada et al. | |
| 6,014,634 A | 1/2000 | Scroggie et al. | |
| 6,024,286 A | 2/2000 | Bradley et al. | |
| 6,035,280 A | 3/2000 | Christensen | |
| 6,038,551 A | 3/2000 | Barlow et al. | |
| 6,041,309 A | 3/2000 | Laor | |
| 6,047,325 A | 4/2000 | Jain et al. | |
| 6,049,778 A | 4/2000 | Walker et al. | |
| 6,052,468 A | 4/2000 | Hillhouse | |
| 6,052,690 A | 4/2000 | de Jong | |
| 6,052,785 A | 4/2000 | Lin et al. | |
| 6,055,509 A | 4/2000 | Powell | |
| 6,061,660 A | 5/2000 | Eggleston et al. | |
| 6,067,526 A | 5/2000 | Powell | |
| 6,070,147 A | 5/2000 | Harms et al. | |
| 6,073,238 A | 6/2000 | Drupsteen | |
| 6,076,068 A | 6/2000 | DeLapa et al. | |
| 6,076,069 A | 6/2000 | Laor | |
| 6,089,611 A | 7/2000 | Blank | |
| 6,094,656 A | 7/2000 | De Jong | |
| 6,101,422 A | 8/2000 | Furlong | |
| 6,101,477 A | 8/2000 | Hohle et al. | |
| 6,105,002 A | 8/2000 | Powell | |
| 6,105,865 A | 8/2000 | Hardesty | |
| 6,105,873 A | 8/2000 | Jeger | |
| 6,112,987 A | 9/2000 | Lambert et al. | |
| 6,112,988 A | 9/2000 | Powell | |
| 6,119,933 A | 9/2000 | Wong et al. | |
| 6,119,945 A | 9/2000 | Muller et al. | |
| 6,122,631 A | 9/2000 | Berbec et al. | |
| 6,129,274 A | 10/2000 | Suzuki | |
| 6,144,948 A | 11/2000 | Walker et al. | |
| 6,151,586 A | 11/2000 | Brown | |
| 6,151,587 A | 11/2000 | Matthias | |
| 6,154,751 A | 11/2000 | Ault et al. | |
| 6,161,870 A | 12/2000 | Blank | |
| 6,164,549 A | 12/2000 | Richards | |
| 6,170,061 B1 | 1/2001 | Beser | |
| 6,173,269 B1 | 1/2001 | Solokl et al. | |
| 6,173,891 B1 | 1/2001 | Powell | |
| 6,179,205 B1 | 1/2001 | Sloan | |
| 6,179,710 B1 | 1/2001 | Sawyer et al. | |
| 6,183,017 B1 | 2/2001 | Najor et al. | |
| 6,185,541 B1 | 2/2001 | Scroggie et al. | |
| 6,189,100 B1 | 2/2001 | Barr et al. | |
| 6,189,878 B1 | 2/2001 | Dorf | |
| 6,195,666 B1 | 2/2001 | Schneck et al. | |
| 6,210,276 B1 | 4/2001 | Mullins | |
| 6,216,014 B1 | 4/2001 | Proust et al. | |
| 6,216,204 B1 | 4/2001 | Thiriet | |
| 6,220,510 B1 | 4/2001 | Everett et al. | |
| 6,222,914 B1 | 4/2001 | McMullin | |
| 6,230,143 B1 | 5/2001 | Simons et al. | |
| 6,237,145 B1 | 5/2001 | Narasimhan et al. | |
| 6,241,287 B1 | 6/2001 | Best et al. | |
| 6,243,687 B1 | 6/2001 | Powell | |
| 6,243,688 B1 | 6/2001 | Kalina | |
| 6,244,958 B1 | 6/2001 | Acres | |
| 6,266,647 B1 | 7/2001 | Fernandez | |
| 6,267,263 B1 | 7/2001 | Emoff et al. | |
| 6,269,158 B1 | 7/2001 | Kim | |
| 6,279,112 B1 | 8/2001 | O'Toole, Jr. et al. | |
| 6,282,516 B1 | 8/2001 | Giuliani | |
| 6,292,785 B1 | 9/2001 | McEvoy et al. | |
| 6,292,786 B1 | 9/2001 | Deaton et al. | |
| 6,296,191 B1 | 10/2001 | Hamann et al. | |
| 6,299,530 B1 | 10/2001 | Hansted et al. | |
| 6,321,208 B1 | 11/2001 | Barnett et al. | |
| 6,385,723 B1 | 5/2002 | Richards | |
| 6,390,374 B1 | 5/2002 | Carper et al. | |
| 6,480,935 B1 | 11/2002 | Carper et al. | |
| 6,549,773 B1 | 4/2003 | Linden et al. | |
| 6,549,912 B1 | 4/2003 | Chen | |
| 6,612,490 B1 | 9/2003 | Herrendoerfer et al. | |
| 6,681,995 B2 | 1/2004 | Sukeda et al. | |
| 6,689,345 B2 | 2/2004 | Jager Lezer | |
| 7,069,249 B2* | 6/2006 | Stolfo et al. | 705/74 |
| 7,398,253 B1* | 7/2008 | Pinnell | 705/66 |
| 2001/0029496 A1* | 10/2001 | Otto et al. | 705/74 |
| 2002/0002468 A1 | 1/2002 | Spagna et al. | |
| 2002/0076051 A1 | 6/2002 | Nii | |
| 2002/0111919 A1 | 8/2002 | Weller et al. | |
| 2002/0116341 A1* | 8/2002 | Hogan et al. | 705/64 |
| 2002/0128973 A1* | 9/2002 | Kranzley et al. | 705/53 |
| 2003/0046541 A1* | 3/2003 | Gerdes et al. | 713/168 |
| 2003/0069857 A1 | 4/2003 | Junda | |
| 2003/0168510 A1 | 9/2003 | Allen | |
| 2003/0188171 A1 | 10/2003 | DeCenzo et al. | |
| 2004/0158532 A1* | 8/2004 | Breck et al. | 705/74 |
| 2004/0177047 A1* | 9/2004 | Graves et al. | 705/71 |
| 2004/0254848 A1* | 12/2004 | Golan et al. | 705/26 |
| 2005/0021781 A1* | 1/2005 | Sunder et al. | 709/229 |
| 2009/0157554 A1* | 6/2009 | Hobson et al. | 705/64 |

FOREIGN PATENT DOCUMENTS

| | | |
|---|---|---|
| BE | 1002756 A6 | 5/1991 |
| CA | 2293944 | 8/2000 |
| CA | 2267041 | 9/2000 |
| CA | 2317138 A1 | 1/2002 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2001 |
| KR | 0039297 A | 5/2001 |
| KR | 0044823 A | 6/2001 |
| KR | 0058742 A | 7/2001 |
| KR | 0021237 A | 3/2002 |
| WO | WO 90/16126 A1 | 12/1990 |
| WO | WO 96/25724 A1 | 8/1996 |
| WO | WO 96/38945 A1 | 12/1996 |
| WO | WO 96/42109 A1 | 12/1996 |

| | | | | | | |
|---|---|---|---|---|---|---|
| WO | WO 97/05582 | A1 | 2/1997 | WO | WO 01/18633 A1 | 3/2001 |
| WO | WO 97/10562 | A1 | 3/1997 | WO | WO 01/18746 A1 | 3/2001 |
| WO | WO 97/39424 | A1 | 10/1997 | WO | WO 01/29672 A1 | 4/2001 |
| WO | WO 98/02834 | A1 | 1/1998 | WO | WO 01/33390 A2 | 5/2001 |
| WO | WO 98/09257 | A1 | 3/1998 | WO | WO 01/40908 A2 | 6/2001 |
| WO | WO 98/20465 | A1 | 5/1998 | WO | WO 01/42887 A2 | 6/2001 |
| WO | WO 98/43169 | A2 | 10/1998 | WO | WO 01/44900 A2 | 6/2001 |
| WO | WO 98/43212 | A1 | 10/1998 | WO | WO 01/44949 A2 | 6/2001 |
| WO | WO 98/52153 | A2 | 11/1998 | WO | WO 01/47176 A1 | 6/2001 |
| WO | WO 99/10824 | A1 | 3/1999 | WO | WO 01/50229 A2 | 7/2001 |
| WO | WO 99/16030 | A1 | 4/1999 | WO | WO 01/52575 A1 | 7/2001 |
| WO | WO 99/19846 | A2 | 4/1999 | WO | WO 01/55955 A1 | 8/2001 |
| WO | WO 99/44172 | A1 | 9/1999 | WO | WO 01/59563 A1 | 8/2001 |
| WO | WO 99/45507 | A1 | 9/1999 | WO | WO 01/61620 A1 | 8/2001 |
| WO | WO 99/49415 | A2 | 9/1999 | WO | WO 01/65545 A2 | 9/2001 |
| WO | WO 99/49426 | A1 | 9/1999 | WO | WO 01/67694 A1 | 9/2001 |
| WO | WO 00/39714 | A1 | 7/2000 | WO | WO 01/71648 A2 | 9/2001 |
| WO | WO 00/46665 | A2 | 8/2000 | WO | WO 01/71679 A2 | 9/2001 |
| WO | WO 00/54507 | A1 | 9/2000 | WO | WO 01/73530 A2 | 10/2001 |
| WO | WO 00/57315 | A2 | 9/2000 | WO | WO 01/73533 A1 | 10/2001 |
| WO | WO 00/57613 | A1 | 9/2000 | WO | WO 01/78020 A1 | 10/2001 |
| WO | WO 00/62265 | A1 | 10/2000 | WO | WO 01/80563 A1 | 10/2001 |
| WO | WO 00/62472 | A1 | 10/2000 | WO | WO 01/84377 A2 | 11/2001 |
| WO | WO 00/67185 | A1 | 11/2000 | WO | WO 01/84474 A2 | 11/2001 |
| WO | WO 00/68797 | A1 | 11/2000 | WO | WO 01/84512 A1 | 11/2001 |
| WO | WO 00/68902 | A1 | 11/2000 | WO | WO 01/88705 A1 | 11/2001 |
| WO | WO 00/68903 | A1 | 11/2000 | WO | WO 02/06948 A1 | 1/2002 |
| WO | WO 00/69183 | A2 | 11/2000 | WO | WO 02/10962 A1 | 2/2002 |
| WO | WO 00/75775 | A2 | 12/2000 | WO | WO 02/14991 A2 | 2/2002 |
| WO | WO 00/77750 | A1 | 12/2000 | WO | WO 02/15037 A2 | 2/2002 |
| WO | WO 01/04851 | A1 | 1/2001 | WO | WO 02/21315 A1 | 3/2002 |
| WO | WO 01/06341 | A1 | 1/2001 | WO | WO 02/29577 A2 | 4/2002 |
| WO | WO 01/08087 | A1 | 2/2001 | WO | WO 02/088895 A2 | 11/2002 |
| WO | WO 01/13572 | A1 | 2/2001 | | | |
| WO | WO 01/15397 | A1 | 3/2001 | * cited by examiner | | |

CENTRALIZED ELECTRONIC COMMERCE CARD TRANSACTIONS

BACKGROUND OF THE INVENTION

Electronic commerce cards are frequently used by consumers to make purchases from merchants over the Internet. Electronic commerce cards include credit cards, debit cards, prepaid purchase cards, travel cards, or any other system that can be used instead of cash to purchase goods or services. One example of an authentication system enables a cardholder to associate a password or other identifying information with an electronic commerce card. To make a purchase online, the consumer must provide the password or other identifying information associated with the electronic commerce card. This ensures that the person possessing the electronic commerce card is actually authorized to use the electronic commerce card.

Once a consumer has been authenticated as an authorized cardholder, the electronic commerce card transaction can be completed by the merchant. Previously, authentication and transaction processing used a decentralized, distributed computing model to communicate messages between merchants, card associations, and authentication servers. In this approach, there is no centralized point for collecting data and monitoring system performance. Instead, each end point in the system, such as merchants, authentication servers, and card issuers, must be asked to collect data and monitor performance of their portion of the overall system.

This decentralized model makes it difficult for the electronic commerce card association, which is responsible for the entire system, to evaluate the system performance as a whole. Additionally, this lack of visibility of the entire system prevents the card association from spotting trends or patterns that would assist in understanding where and how to add new features. Furthermore, the decentralized model makes upgrades and migration difficult, as each end point must be able to communicate with its counterparts, regardless of the features or software versions supported. The decentralized model also increases support and service overhead, and decreases the fault tolerance of the system.

Therefore, it is desirable to have an electronic commerce card authentication and transaction processing system that facilitates monitoring and management, increases overall reliability and fault tolerance, and simplifies system upgrades and migrations.

BRIEF SUMMARY OF THE INVENTION

An embodiment of the invention includes a central transaction server in electronic commerce card authorization system to enables the electronic commerce card association to manage and monitor the entire authentication system. The central transaction server acts as an intermediary for all communications to and from the access control server (ACS) used to authenticate a cardholder. Additionally, if any portion of the authentication system fails, for example, a card issuer's ACS, the central transaction server can compensate by providing appropriate responses to other portions of the system. Additionally, the centralized transaction server enables portions of the system to be upgraded without breaking compatibility with the non-upgraded portions. As all traffic between merchant and cardholder systems and the card issuer ACS systems is routed through the centralized transaction server, the centralized transaction server can translate all incoming traffic into a format compatible with the intended recipient.

In an embodiment, the central transaction server is adapted to receive an authentication request from a cardholder system, forward the authentication request to an access control server, and relay authentication information between the access control server and the cardholder system. The central authentication server also receives an authentication response from the access control server and forwards the authentication response to the cardholder system. The authentication response is adapted to be analyzed by a merchant system. In a further embodiment, the central transaction server is adapted to forward a copy of the authentication response to an authentication history server to be archived.

In an additional embodiment, the central transaction server is further adapted to receive a verifying enrollment request from a directory server, and to send a verifying enrollment response to the directory server. In one implementation, the central transaction server is adapted to send the verifying enrollment response in response to a query to the access control server. In an alternate implementation, the central transaction server is adapted to send the verifying enrollment response to the directory server without querying the access control server, and is further adapted to query the access control server in response to receiving an authentication request.

In another embodiment, the authentication request includes a pseudonym corresponding to an electronic commerce card account number and previously created by the central transaction server. Alternately, the authentication request includes a pseudonym previously created by a merchant system that corresponds to an electronic commerce card account number.

In yet a further embodiment, the central transaction server is adapted to initiate a charge request via a card association network in response to receiving an authentication response from the access control server.

BRIEF DESCRIPTION OF THE DRAWINGS

The invention will be described with reference to the drawings, in which.

DETAILED DESCRIPTION OF THE INVENTION

Figure 1:
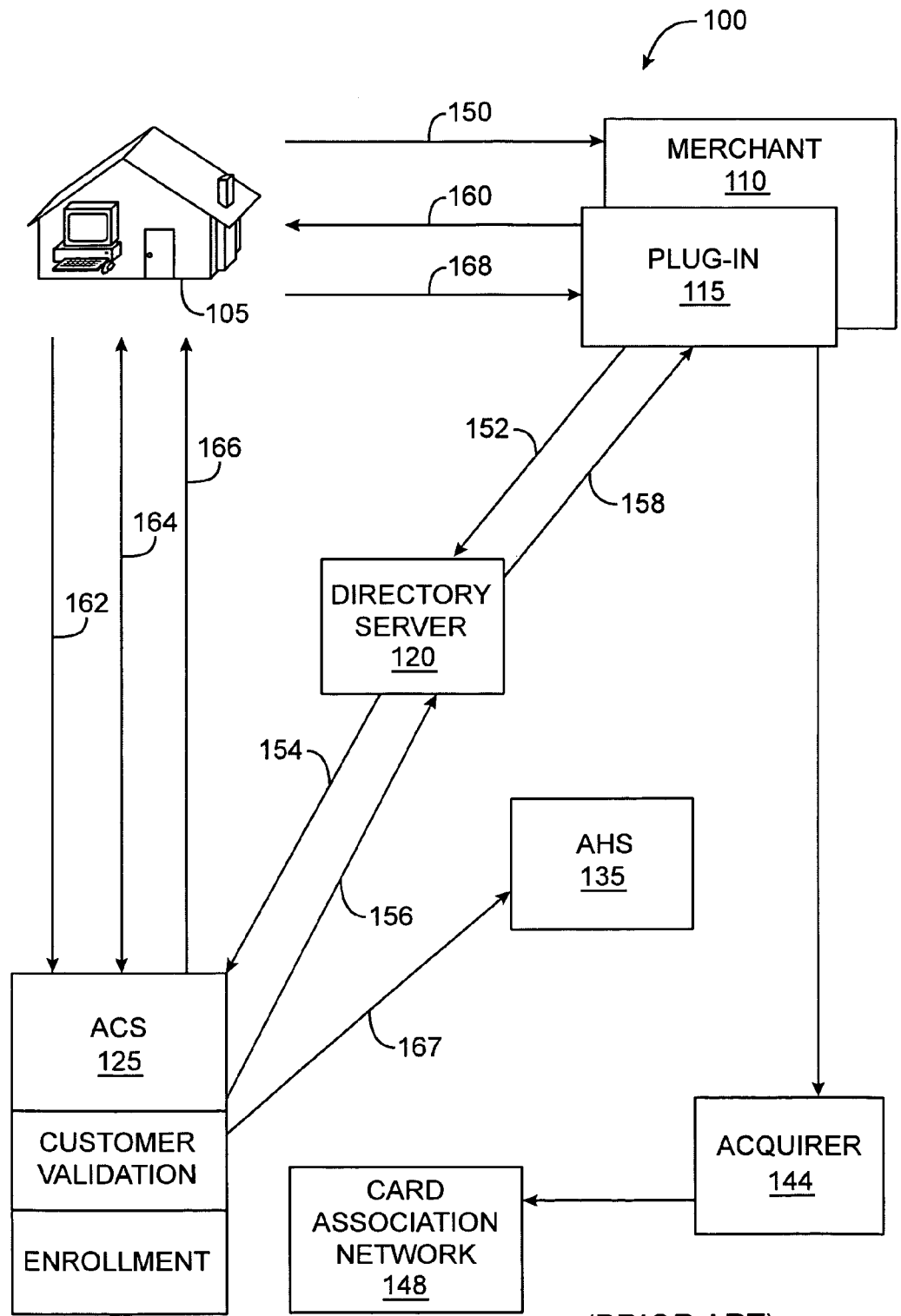
FIG. 1 illustrates a prior decentralized card authentication system.

FIG. 1 illustrates a prior decentralized card authentication system 100. System 100 enables cardholders to be authenticated when making electronic commerce card purchases online. Cardholder system 105 initiates an online purchase by accessing a merchant computer 110. In an embodiment, cardholder system 105 accesses a website provided by the merchant computer 110 via the Internet via a web browser. Alternatively, cardholder system 105 can access the merchant computer 110 via an alternate electronic communications network. The cardholder system 105 can be any type of communications device, for example a personal computer, a personal digital assistant, or a telephone.

To complete a purchase, a cardholder uses the cardholder system 105 to submit her electronic commerce card information 150, such as a card number and expiration date, to the merchant system 110. In an embodiment, a secure communication system, such as SSL, is used for all communications, including the electronic commerce card information 150.

In response to the electronic commerce card information 150, the merchant system initiates an authentication procedure to determine whether the electronic commerce card information is valid and has been provided by an authorized cardholder. In an embodiment of system 100, there are numerous electronic commerce card issuers. Each electronic commerce card issuer is responsible for authenticating its own electronic commerce cards. To authenticate the electronic commerce card information 150, the merchant system 110 must locate the authentication service of the electronic commerce card issuer associated with the electronic commerce card information 150.

The merchant system sends a verifying enrollment request (VEReq) 152 to a directory server 120 to locate the appropriate authentication service. In an embodiment, all authentication-related communication is coordinated by an authentication plug-in 115 integrated with the merchant system 110. The VEReq 152 includes at least a portion of the electronic commerce card information 150 to be used by the directory server 120 to identify the authentication service associated with the cardholder's electronic commerce card. In an embodiment, each electronic commerce card issuer is assigned a different range of electronic commerce card numbers. This embodiment of the directory server 120 includes a list of all electronic commerce card issuers and their associated electronic commerce card number ranges. By comparing the electronic commerce card information with the list of electronic commerce card issuers, the directory server 120 is able to identify the appropriate authentication service.

After identifying the authentication service, the directory server 120 forwards the VEReq 154 to an access control server (ACS) 125 associated with the card issuer's authentication service. The ACS 125 determines whether the card information provided in the VEReq 154 can be authenticated. Card information may not be able to be authenticated by the ACS 125 if, for example, the card information does not include a valid electronic commerce card number, or if there is no authentication information associated with the electronic commerce card number.

If the electronic commerce card information provided in the VEReq 154 can be authenticated, the ACS 125 sends a verified enrollment response (VERes) 156 back to the directory server 120. The VERes 156 includes a message indicating that the ACS 125 can authenticate the electronic commerce card information and a pseudonym corresponding to the card number. The pseudonym can be any type of code or number that can be uniquely linked to card information by the ACS 125 at a later time. The VERes also includes a URL to be accessed by the cardholder system 105 to authenticate the cardholder. For system 100, the URL is associated with a web site provided by the ACS 125. Upon receiving a VERes from the ACS 125, the directory server 120 forwards the VERes 158 to the merchant system 110.

From the received VERes, the merchant system 110 generates an authentication request. The authentication request includes the pseudonym created by the ACS 125 and transaction information associated with the cardholder's prospective purchase. The merchant system then forwards the authentication request 160 to the cardholder system 105. In an embodiment, the authentication request is sent to the cardholder system 105 with a web page having a redirection command, such as an HTTP redirect, to a web site hosted by the ACS 125. This web page also includes a URL for returning information to the merchant system 110.

In response the authentication request received from the merchant system 110, the cardholder system 105 accesses 162 a web site hosted by the ACS 125. In accessing this web site, the cardholder system 105 supplies the ACS 125 with the pseudonym originally created by the ACS for the VERes.

The cardholder to authenticates her identity by presenting authentication information 164 to the web site provided by the ACS 125. In an embodiment, the cardholder authenticates her identity by providing to the ACS 125 a password or other identifying information previously associated with the electronic commerce card. The ACS 125 uses the pseudonym provided by the cardholder system to identify the electronic commerce card being supplied by the cardholder and retrieve authentication information previously associated with the electronic commerce card. In an embodiment, the ACS 125 matches the pseudonym received via the authentication request 162 with the pseudonym previously created for VERes 156. In a further embodiment, the pseudonym expires after a limited period of time, for example five minutes, to prevent fraudulent reuse of the authentication request.

The ACS 125 returns an authentication response 166 to the cardholder system 105. The cardholder system 105 in turn forwards the authentication response 168 to the merchant system 110. If the authentication information 164 provided by the cardholder matches the authentication information previously associated with the electronic commerce card, the authentication response includes a message indicating that the authentication was successful. Alternatively, the authentication response can include a message indicating that the authentication failed. In a further embodiment, the authentication response also includes an error code identifying the reason for authentication failure.

In addition to sending the authentication response to the merchant system 110, a copy of the authentication response 167 is sent to an authentication history server 135. The authentication history server 135 maintains an archive of all authentications performed by the system 100. The authentication response is digitally signed to prevent the cardholder system 105 or other third party systems from tampering with the contents of the authentication response.

After receiving the authentication response 168, the merchant system 110 validates the authentication response. To validate the authentication response 168, the merchant system 110 first verifies the digital signature associated with the authentication response to ensure that there has not been any tampering. Once the authentication response is determined to have arrived intact, and the response is for the request originally submitted, the contents of the authentication response are analyzed to determine if authentication has been successful. If the authentication was not successful, the merchant system 110 halts the transaction. If the authentication was successful, the merchant system 110 can continue with the transaction by initiating a charge to the electronic commerce card provided by the cardholder. In an embodiment, the merchant system 110 charges the electronic commerce card by submitting the card information to a card acquirer 144. The card acquirer then sends the charge request over a private card association network 148 to be processed by the electronic commerce card issuer associated with the card. In a further embodiment, an electronic commerce indicator and a Cardholder Authentication Verification Value, which indicates that the electronic commerce card has been successfully verified, is included with the charge request.

The decentralized nature of the electronic commerce card authentication system 100 makes it difficult to be managed and monitored by electronic commerce card associations. Additionally, if any portion of the system 100 fails, for example, a card issuer's ACS, there is no way for the system 100 to compensate. The decentralized electronic commerce card authentication system 100 is difficult to upgrade, as each end point of the system, for example the directory server and the numerous ACS and merchant systems, must all be upgraded simultaneously to ensure compatibility.

Figure 2:
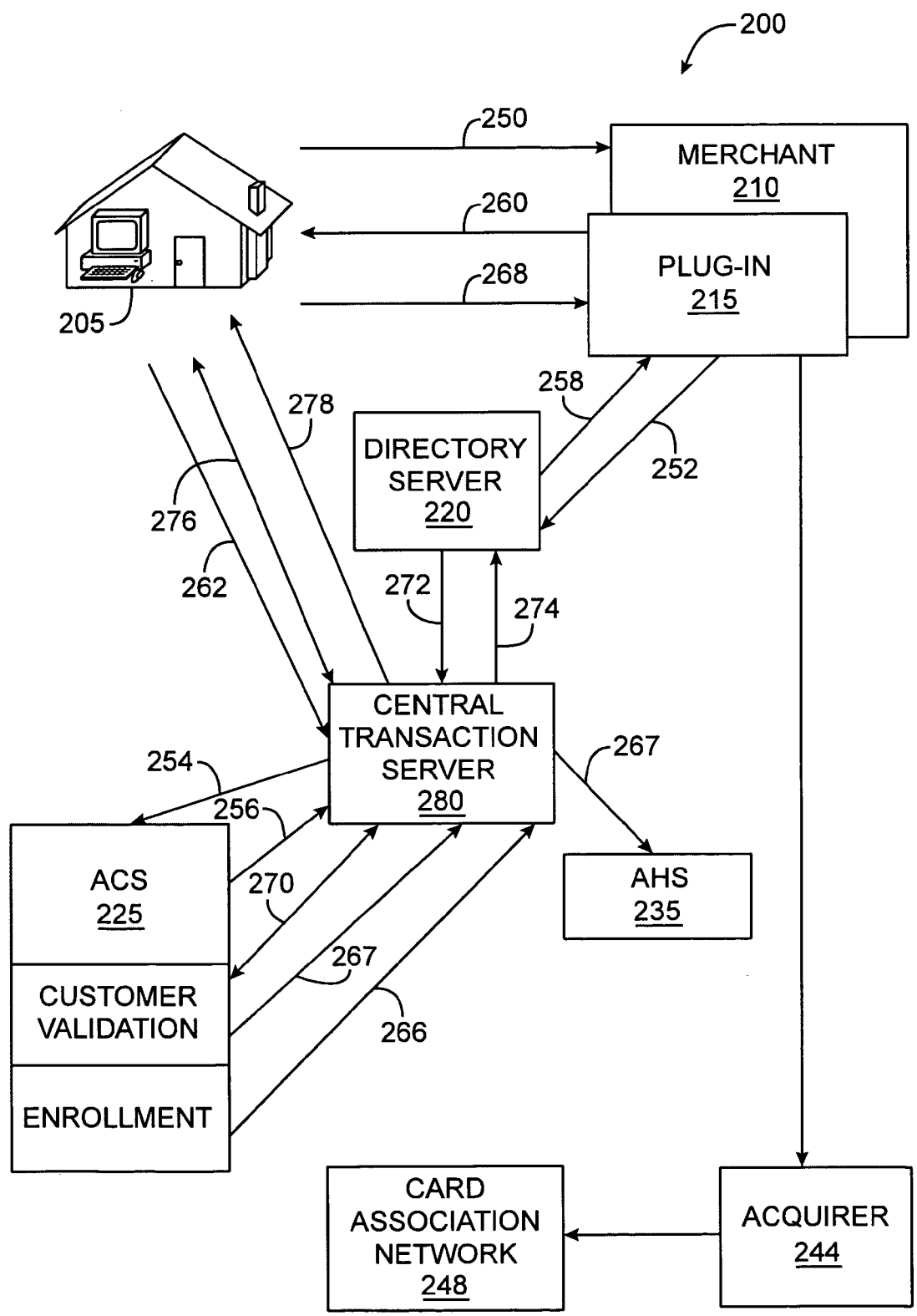
FIG. 2 illustrates an example card authentication system according to an embodiment of the invention.

FIG. 2 illustrates an example improved card authentication system 200 according to an embodiment of the invention. Cardholder system 205 initiates an online purchase by accessing a merchant computer 210. In an embodiment, cardholder system 205 accesses a website provided by the merchant computer 210 via the Internet using a web browser. Alternatively, cardholder system 205 can access the merchant computer 210 via an alternate electronic communications network. The cardholder system 205 can be any type of communications device, for example a personal computer, a personal digital assistant, or a telephone.

To complete a purchase, a cardholder uses the cardholder system 205 to submit her electronic commerce card information 250, such as a card number and expiration date, to the merchant system 210. In an embodiment, a secure communication system, such as SSL, is used for all communications, including the electronic commerce card information 250.

In response to the electronic commerce card information 250, the merchant system initiates an authentication procedure to determine whether the electronic commerce card information is valid and has been provided by an authorized cardholder. To authenticate the electronic commerce card information 250, the merchant system 210 must locate the authentication service of the electronic commerce card issuer associated with the electronic commerce card information 250.

The merchant system sends a verifying enrollment request (VEReq) 252 to a directory server 220 to locate the appropriate authentication service. In an embodiment, all authentication-related communication is coordinated by an authentication plug-in 215 integrated with the merchant system 210. The VEReq 252 includes at least a portion of the electronic commerce card information 250 to be used by the directory server 220 to identify the access control server (ACS) 225 associated with the cardholder's electronic commerce card. In an embodiment, each electronic commerce card issuer is assigned a different range of electronic commerce card numbers. This embodiment of the directory server 220 includes a list of all electronic commerce card issuers and their associated electronic commerce card number ranges. By comparing the electronic commerce card information with the list of electronic commerce card issuers, the directory server 220 is able to identify the appropriate ACS.

After identifying the ACS, the directory server 220 forwards the VEReq 272 to a central transaction server 280. As discussed in detail below, the central transaction server 280 acts as a proxy for all communications between ACS systems and cardholder systems, merchant systems, authentication history servers, and directory servers. In response to the VEReq 272, the central transaction server 280 replies with a VERes 274. In this embodiment, the central transaction server 280 creates a VERes 274 without checking with the ACS 225 to determine whether the card information can be authenticated. This is done for compatibility purposes, and, as discussed below, streamlines the authentication process.

In an alternate embodiment, the central transaction server 280 forwards the VEReq to the ACS 225. ACS 225 returns a VERes, similar to that discussed above, to the central transaction server 280. The central transaction server 280 alters the VERes received from the ACS 225 to direct the cardholder system 205 to include a URL is associated with a web site provided by the central transaction server 280, as discussed in detail below, rather than a web site provided by the ACS, as discussed in system 100. If the ACS 225 is not available, or an error is encountered while communicating with the ACS 225, or if the response from the ACS 225 cannot be understood, the central transaction server 280 will generate a substitute VERes on behalf of the ACS, including an indication of why the response is being generated. Examples of these indicators include: 1) the cardholder has not provided authentication information; 2) the card issuer has not implemented the authentication system; 3) the central transaction server 280 timed out waiting on a response from the ACS 225; and 4) the VERes received from ACS 225 could not be understood by the central transaction server 280. The indicator in included in the pseudonym associated with the card information and is used later in generating the Cardholder Authentication Verification Value.

The VERes 274 created by the central transaction server 280 includes a message indicating that the ACS 225 can authenticate the electronic commerce card information and a pseudonym corresponding to the card number. The pseudonym can be any type of code or number that can be uniquely linked to card information by the ACS 225 at a later time. The VERes also includes a URL to be accessed by the cardholder system 205 to authenticate the cardholder. For system 200, the URL is associated with a web site provided by the central transaction server 280. Upon receiving a VERes from the central transaction server 280, the directory server 220 forwards the VERes 258 to the merchant system 210.

From the received VERes, the merchant system 210 generates an authentication request. The authentication request includes the pseudonym created by the central transaction server 280 and transaction information associated with the cardholder's prospective purchase. The merchant system then forwards the authentication request 260 to the cardholder system 205. In an embodiment, the authentication request is sent to the cardholder system 205 with a web page having a redirection command, such as an HTTP redirect, to a web site hosted by the central transaction server 280. This web page also includes a URL for returning information to the merchant system 210.

In response the authentication request received from the merchant system 210, the cardholder system 205 accesses 262 the web site hosted by the central transaction server 280. In accessing this web site, the cardholder system 205 supplies the central transaction server 280 with the authentication request, including the pseudonym created by the central transaction server 280 earlier.

The central transaction server 280 provides a VEReq 254 to the ACS 225 associated with the card issuer's authentication service. The ACS 225 determines whether the card information provided in the VEReq 254 can be authenticated. If the electronic commerce card information provided in the VEReq 254 can be authenticated, the ACS 225 sends a verified enrollment response (VERes) 256 back to the central transaction server. In this embodiment, the central transaction server 280 has integrated the step of sending a VEReq and receiving a VERes into the processing of authentication request from the cardholder system, which streamlines the authentication process. As discussed above, an alternate embodiment of the central transaction server 280 previously sent a VEReq to the ACS 225, and thus does not need to repeat this communication.

In response to the VERes 256, the central transaction server 280 sends the authentication request received from the merchant system 210 via the cardholder system 205 to the ACS 225. The cardholder authenticates her identity by presenting authentication information to the web site provided by the ACS 225. The central transactions server relays all communications 276 between the cardholder system 205 and the ACS 225. In an alternate embodiment, communications 276 between the cardholder system and the ACS 225 occur directly without the central transaction server as an intermediary.

In an embodiment, the cardholder authenticates her identity by providing to the ACS 225 a password or other identifying information previously associated with the electronic commerce card. The ACS 225 uses the pseudonym provided by the cardholder system to identify the electronic commerce card being supplied by the cardholder and retrieve authentication information previously associated with the electronic commerce card. In an embodiment, the ACS 225 matches the pseudonym received via the authentication request with the pseudonym previously created for VERes 156. In a further embodiment, the pseudonym expires after a limited period of time, for example five minutes, to prevent fraudulent reuse of the authentication request. In another embodiment, the ACS 225 and the central transaction server 280 each generate their own unique pseudonym corresponding to the electronic commerce card. By allowing the ACS 225 to generate and use its own pseudonym to identify the electronic commerce card, the ACS 225 does not need to be changed to work with the central transaction server 280.

The ACS 225 returns an authentication response 266 to the central transaction server 280, which in turn forwards an authentication response 278 to the cardholder system 205. The cardholder system 205 in turn forwards the authentication response 268 back to the merchant system 210. If the authentication information 164 provided by the cardholder matches the authentication information previously associated with the electronic commerce card, the authentication response includes a message indicating that the authentication was successful. Alternatively, the authentication response can include a message indicating that the authentication failed. In a further embodiment, the authentication response also includes an error code identifying the reason for authentication failure.

If, for example, the ACS 225 does not support authentication functions, the ACS 225 is not operating or does not reply to the central transaction server 280 within a predetermined period of time, or the central transaction server 280 does not understand the VERes provided by the ACS 225, the ACS 225 cannot authenticate the electronic commerce card information. In response to an authentication failure by the ACS, for these example reasons or any other reason, an embodiment of the central transaction server 280 can return an attempted authentication response to the cardholder system 205. The attempted authentication response can authorize the merchant system 210 to continue the transaction without authentication, or to halt the transaction. The action specified by the attempted authentication response can be determined by one or more business rules, for example, permitting a transaction to continue without authorization if the ACS is unavailable, but halting the transaction if the ACS returns an unintelligible VERes.

In addition to sending the authentication response to the merchant system 210, a copy of the authentication response 267 is sent from the ACS 225 to an authentication history server 235 via the central transaction server 280. The authentication history server 235 maintains an archive of all authentications performed by the system 200.

After receiving the authentication response 268, the merchant system 210 validates the authentication response. The authentication response is digitally signed to prevent the cardholder system 205 or other third party systems from tampering with the contents of the authentication response.

To validate the authentication response 268, the merchant system 210 first verifies the digital signature associated with the authentication response to ensure that there has not been any tampering. Once the authentication response is determined to have arrived intact, and the response is for the request originally submitted, the contents of the authentication response are analyzed to determine if authentication has been successful. If the authentication was not successful, the merchant system 210 halts the transaction. If the authentication was successful, the merchant system 210 can continue with the transaction by initiating a charge to the electronic commerce card provided by the cardholder. In an embodiment, the merchant system 210 charges the electronic commerce card by submitting the card information to a card acquirer 244. The card acquirer then sends the charge request over a private card association network 248 to be processed by the electronic commerce card issuer associated with the card. In a further embodiment, an electronic commerce indicator and a Cardholder Authentication Verification Value, which indicates that the electronic commerce card has been successfully verified, is included with the charge request.

The use of a central transaction server in system 200 enables the electronic commerce card association to managed and monitored the entire authentication system easily. Additionally, if any portion of the system 200 fails, for example, a card issuer's ACS, the central transaction server can compensate by providing appropriate responses to other portions of the system. Additionally, the centralized transaction server enables portions of the system to be upgraded without breaking compatibility with the non-upgraded portions. As all traffic between merchant and cardholder systems and the card issuer ACS systems is routed through the centralized transaction server, the centralized transaction server can translate all incoming traffic into a format compatible with the intended recipient.

An additional advantage of the centralized transaction server is that it enables the integration of formally separate portions of the authentication system into a single unit. This integration increases reliability, decreases service overhead, and allows for streamlining of the authentication process.

Figure 3:
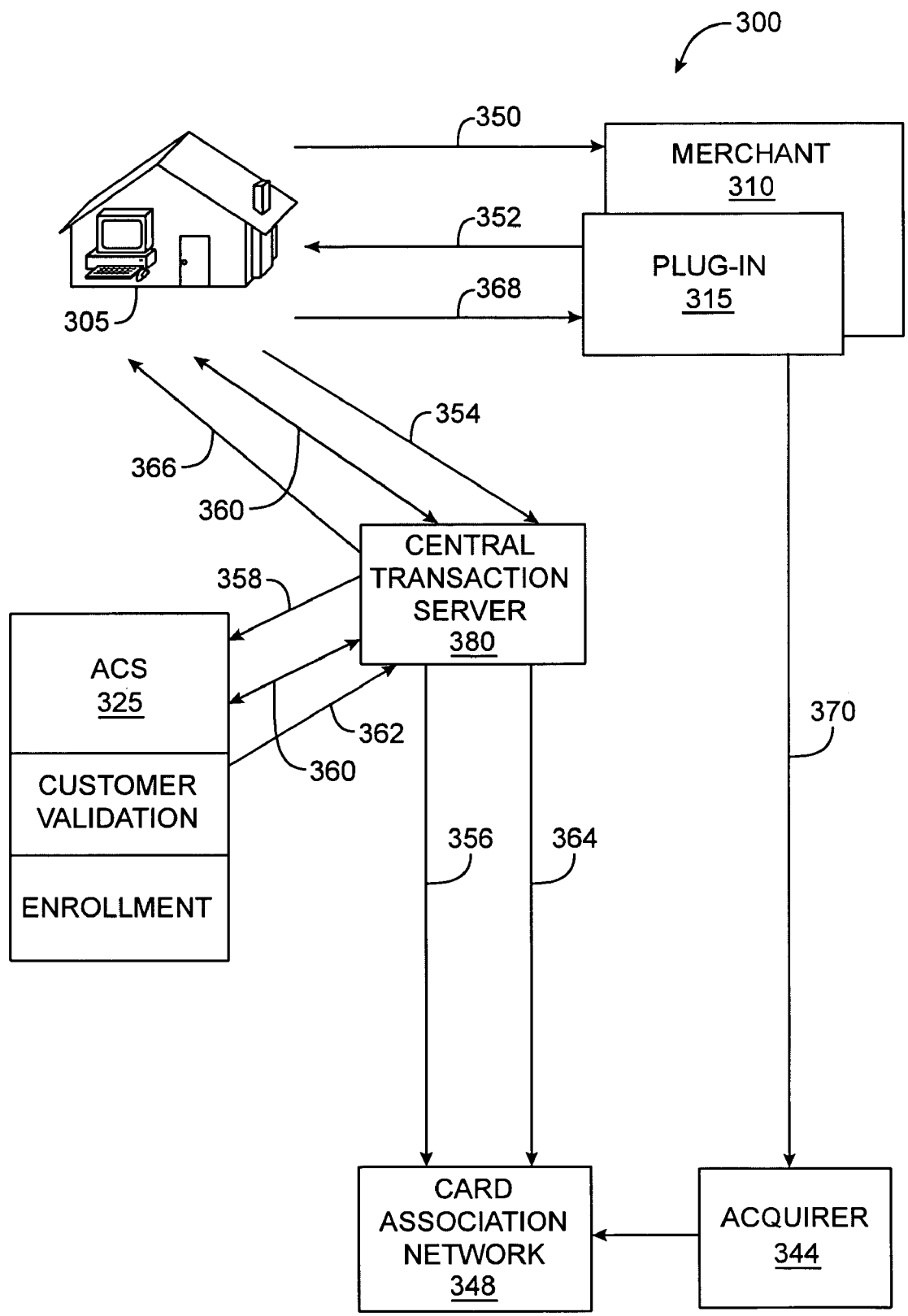
FIG. 3 illustrates an example card authentication system according to an alternate embodiment of the invention.

FIG. 3 illustrates an example card authentication system 300 according to an alternate embodiment of the invention. In this embodiment, the functions of the directory server and the authentication history server have been integrated into the central transaction server and the card association network, enabling the elimination of several steps of the authentication process. As with other embodiments, cardholder system 305 initiates an online purchase by accessing a merchant computer 310. To complete a purchase, a cardholder uses the cardholder system 305 to submit her electronic commerce card information 350 to the merchant system 310.

In response to the electronic commerce card information 350, the merchant system 310 initiates an authentication procedure to determine whether the electronic commerce card information is valid and has been provided by an authorized cardholder. To authenticate the electronic commerce card information 350, the merchant system 310 sends an authentication request 352 to the cardholder system 305. The authentication request includes a pseudonym created by the merchant system 310 and transaction information associated with the cardholder's prospective purchase. The pseudonym can be any type of code or number that can be uniquely linked to card information by the central transaction server 380 at a later time.

In an embodiment, the authentication request is sent to the cardholder system 305 with a web page having a redirection command, such as an HTTP redirect, to a web site hosted by the central transaction server 380. This web page also includes a URL for returning information to the merchant system 310.

In response the authentication request received from the merchant system 310, the cardholder system 305 accesses 354 the web site hosted by the central transaction server 380. In accessing this web site, the cardholder system 305 supplies the central transaction server 380 with the authentication request, including the pseudonym created by the merchant system 310. The central transaction server 380 determines the card information from the pseudonym provided in the authentication request. The card information is then used by the central transaction server 380 to identify the ACS 325 responsible for authenticating the cardholder, for example by comparing the electronic commerce card information with the electronic commerce card number ranges associated with card issuers.

The central transaction server 380 sends a verifying enrollment request (VEReq) 358 to the appropriate ACS 325 to confirm that the ACS can authenticate the card information provided. A copy 356 of the VEReq is sent to the card association network 348 for archival. If the ACS 325 responds with a successful VERes, the central transaction server 380 then facilitates the exchange of authentication information 360 between the cardholder system 305 and the ACS 325. Upon successful authentication, the ACS 325 sends an authentication response 362 to the central transaction server 380. The central transaction server 380 in turns forwards a copy 366 of the authentication response to the cardholder system 305 and another copy 364 of the authentication response to the card association network 348 for archival.

The cardholder system 305 forwards a copy of the authentication response 368 back to the merchant system 310. After receiving the authentication response 368, the merchant system 310 validates the authentication response by verifying the digital signature associated with the authentication response to ensure that there has not been any tampering and analyzing the authentication response. If the authentication was not successful, the merchant system 310 halts the transaction. If the authentication was successful, the merchant system 310 can continue with the transaction by initiating a charge to the electronic commerce card provided by the cardholder. In an embodiment, the merchant system 310 charges the electronic commerce card by submitting the card information to a card acquirer 344. The card acquirer then sends the charge request 370 over a private card association network 348 to be processed by the electronic commerce card issuer associated with the card.

As the different portions of authentication system are integrated into the central transaction server 380, additionally optimizations can be implemented. For example, in a further embodiment, the central transaction server 380 initiates a charge to the electronic commerce card automatically when the ACS 325 returns a successful authentication response. In this embodiment, the acquirer 344 is bypassed and the central transactions server 380 sends the charge request directly to the card association network 348.

Although the invention has been discussed with respect to specific embodiments thereof, these embodiments are merely illustrative, and not restrictive, of the invention. For example, the present invention can be utilized with any authentication system. Thus, the scope of the invention is to be determined solely by the claims.

What is claimed is:

1. An electronic commerce card authentication system comprising:
  a merchant system wherein the merchant system is configured to:
    send a verifying enrollment request to a directory server, the verifying enrollment request including at least a portion of an electronic commerce card account number;
    receive a verifying enrollment response from the directory server, the verifying enrollment response including a web site hosted by a central transaction server, the verifying enrollment response further including a pseudonym corresponding to the electronic commerce card account number, the pseudonym expiring after a predetermined period of time;
    send an authentication request to a cardholder system in a web page having an HTTP redirect command comprising the web site hosted by the central transaction server, the web page further including a URL for returning information to the merchant system, the authentication request including the pseudonym corresponding to the electronic commerce card account number;
    receive an authentication response from the cardholder system at the URL for returning information to the merchant system; and
    analyze the authentication response to determine if the electronic commerce card account number has been successfully authenticated and initiate a payment request process by submitting the electronic commerce card account number to an issuer of the electronic commerce card account number;
  the directory server wherein the directory server is configured to:
    receive the verifying enrollment request from the merchant system;
    forward the verifying enrollment request to the central transaction server;
    receive the verifying enrollment response from the central transaction server; and
    forward the verifying enrollment response to the merchant system; and
  the central transaction server wherein the central transaction server is configured to:
    receive the verifying enrollment request from the directory server;
    send the verifying enrollment response to the directory server;
    receive the authentication request from the cardholder system, at the web site hosted by the central transaction server in response to the HTTP redirect command sent by the merchant system to the cardholder system;
    forward the authentication request to an access control server;
    relay authentication information between the access control server and the cardholder system;
    receive an authentication response from the access control server;
    forward a copy of the authentication response to an authentication history server to be archived; and
    forward the authentication response to the cardholder system.

2. The electronic commerce card authentication system of claim 1, wherein the authentication response is translated to a format compatible with a merchant system.

3. The electronic commerce card authentication system of claim 1, wherein the central transaction server is configured to send the verifying enrollment response in response to a query to the access control server.

4. The electronic commerce card authentication system of claim 1, wherein the central transaction server is configured to send the verifying enrollment response to the directory server with or without querying the access control server, and further is configured to query the access control server in response to receiving an authentication request.

5. The electronic commerce card authentication system of claim 1, wherein the pseudonym was previously created by the central transaction server.

6. The electronic commerce card authentication system of claim 1, wherein the pseudonym was created by the merchant system.

7. The system of claim 1 wherein the payment request process includes a charge request, wherein the charge request is generated by a merchant and is subsequently sent to an acquirer.

8. The system of claim 1, wherein the central transaction server is further configured to host at least one web page.

9. The system of claim 1 wherein the predetermined period of time is 5 minutes.

10. The system of claim 1 wherein the payment request process includes a cardholder authentication verification value which indicates the electronic commerce card has been successfully authenticated.

11. The system of claim 1, wherein the central transaction server and the directory server are integrated into a single server.

12. A method of authenticating electronic commerce card information provided by a cardholder, the method comprising:
    sending a verifying enrollment request from a merchant system to a directory server, the verifying enrollment request including at least a portion of an electronic commerce card account number;
    sending the verifying enrollment request from the directory server to a central transaction server;
    sending a verifying enrollment response from the central transaction server to the directory server, the verifying enrollment response including a web site hosted by the central transaction server, the verifying enrollment response further including a pseudonym corresponding to the electronic commerce card account number, the pseudonym expiring after a predetermined period of time;
    sending the verifying enrollment response from the directory server to the merchant system;
    sending an authentication request to a cardholder system in a web page having an HTTP redirect command comprising the web site hosted by the central transaction server, the web page further including a URL for returning information to the merchant system, the authentication request including the pseudonym corresponding to the electronic commerce card account number;
    receiving the authentication request from the cardholder system, at the web site hosted by the central transaction server in response to the HTTP redirect command sent by the merchant system to the cardholder system;
    forwarding the authentication request to an access control server;
    relaying, at the central transaction server, authentication information between the access control server and the cardholder system;
    receiving an authentication response from the access control server at the central transaction server;
    forwarding a copy of the authentication response to an authentication history server to be archived;
    forwarding the authentication response to the cardholder system from the central transaction server;
    receiving the authentication response from the cardholder system at the URL for returning information to the merchant system; and
    analyzing the authentication response at the merchant system to determine if the electronic commerce card account number has been successfully authenticated and initiating a payment request process by submitting the electronic commerce card account number to an issuer of the electronic commerce card account number.

13. The method of claim 12, wherein the authentication response is translated to a format compatible with a merchant system.

14. The method of claim 12, wherein the verifying enrollment response is sent in response to a query to the access control server.

15. The method of claim 14, further comprising:
    receiving the verifying enrollment response from the access control server in response to the query; and
    forwarding the verifying enrollment response to the directory server.

16. The method of claim 15, further comprising:
    modifying the verifying enrollment response received from the access control server; and
    forwarding the modified verifying enrollment response to the directory server.

17. The method of claim 12, wherein the verifying enrollment response is sent to the directory server without querying the access control server, and further comprising querying the access control server in response to receiving an authentication request.

18. The method of claim 12, wherein the authentication request was previously created by the central transaction server.

19. The method of claim 12, wherein the pseudonym was previously created by the merchant system.

20. The method of claim 12 wherein the payment request process includes a charge request, wherein the charge request is generated by a merchant and is subsequently sent to an acquirer.

21. The method of claim 12 wherein the payment request process includes a cardholder authentication verification value which indicates the electronic commerce card has been successfully authenticated.

22. The method of claim 12, further comprising substituting the authentication response from the access control server with a response generated by the central transaction server.

23. An information storage medium including a set of instructions which when executed by an information processing device cause the information processing device to perform a set of steps, the set of steps comprising:
    receiving a verifying enrollment request from a directory server;
    sending a verifying enrollment response to the directory server;
    receiving an authentication request from a cardholder system, at a web site hosted by a central transaction server in response to an HTTP redirect command sent by a merchant system to the cardholder system, the HTTP redirect command comprising the address of the central transaction server and including a pseudonym corresponding to an electronic commerce card account number;
    forwarding the authentication request to an access control server;
    relaying authentication information between the access control server and the cardholder system;

receiving an authentication response from the access control server;

forwarding a copy of the authentication response to an authentication history server to be archived; and forwarding the authentication response to the cardholder system, wherein the authentication response includes a URL for returning information to the merchant, the cardholder system thereafter forwarding the authentication response to the merchant system, wherein the merchant system analyzes the authentication response to determine if the electronic commerce card account number has been successfully authenticated and initiates a payment request process by submitting the electronic commerce card account number to an issuer of the electronic commerce card account number.

24. The information storage medium of claim 23, wherein the authentication response is translated to a format compatible with the merchant system.

25. The information storage medium of claim 23, wherein the verifying enrollment response is sent in response to a query to the access control server.

26. The information storage medium of claim 23, wherein the verifying enrollment response is sent to the directory server without querying the access control server, and the set of steps further comprise querying the access control server in response to receiving the authentication request.

27. The information storage medium of claim 23, wherein the pseudonym was previously created by the central transaction server.

28. The information storage medium of claim 23, wherein the pseudonym was previously created by the merchant system.

29. The information storage medium of claim 25, further comprising:

receiving the verifying enrollment response from the access control server in response to the query; and forwarding the verifying enrollment response to the directory server.

30. The information storage medium of claim 29, further comprising:

modifying the verifying enrollment response received from the access control server; and forwarding the modified verifying enrollment response to the directory server.

* * * * *